(12) United States Patent  
Ljunggren et al.

(10) Patent No.: US 8,316,108 B2  
(45) Date of Patent: *Nov. 20, 2012

(54) METHOD AND APPARATUS FOR OBTAINING MEDIA OVER A COMMUNICATIONS NETWORK

(75) Inventors: Andreas Ljunggren, Vallingby (SE); Robert Skog, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 186 days.

This patent is subject to a terminal disclaimer.

(21) Appl. No.: 12/918,375

(22) PCT Filed: Feb. 22, 2008

(86) PCT No.: PCT/EP2008/052184  
§ 371 (c)(1),  
(2), (4) Date: Aug. 19, 2010

(87) PCT Pub. No.: WO2009/103344  
PCT Pub. Date: Aug. 27, 2009

(65) Prior Publication Data  
US 2010/0332621 A1 Dec. 30, 2010

(51) Int. Cl.  
*G06F 15/16* (2006.01)
(52) U.S. Cl. .......... 709/219; 709/231; 707/818; 725/32; 725/36; 704/234; 704/246; 704/247; 704/251
(58) Field of Classification Search .................. 709/231, 709/219  
See application file for complete search history.

(56) References Cited

U.S. PATENT DOCUMENTS

| | | | | |
|---|---|---|---|---|
| 8,090,579 B2 * | 1/2012 | DeBusk et al. | ............... | 704/235 |
| 2010/0217785 A1 * | 8/2010 | Yun et al. | ...................... | 707/812 |
| 2010/0332621 A1 * | 12/2010 | Ljunggren et al. | ............ | 709/219 |
| 2010/0332675 A1 * | 12/2010 | Ljunggren et al. | ............ | 709/231 |

FOREIGN PATENT DOCUMENTS

| | | |
|---|---|---|
| EP | 1643716 A1 | 4/2006 |
| WO | 2007/095309 A2 | 8/2007 |
| WO | 2007/123283 A1 | 11/2007 |

OTHER PUBLICATIONS

Xu, D. et al. "On Peer-to-Peer Media Streaming." Proceedings of the 22nd International Conference on Distributed Computing Systems (ICDCS 2002), Vienna, Austria, Jul. 2-5, 2002.

* cited by examiner

*Primary Examiner* — Jude Jean Gilles  
(74) *Attorney, Agent, or Firm* — Coats & Bennett, P.L.L.C.

(57) ABSTRACT

A method and apparatus for obtaining a real time media stream provided as a plurality of media fragments from a plurality of remote nodes in a communications network is described. Media fragments are requested from the plurality of remote nodes. A series of media fragments is received from at least one of the plurality of remote nodes. A selection criterion is determined for identifying the series of data fragments, and a blocking request is sent to at least one other of the plurality of remote nodes, the blocking request instructing the at least one other node to block the media fragments satisfying the selection criterion from being sent.

22 Claims, 9 Drawing Sheets

METHOD AND APPARATUS FOR OBTAINING MEDIA OVER A COMMUNICATIONS NETWORK

TECHNICAL FIELD

The invention relates to the field of obtaining media over a communications network, and in particular to obtaining IPTV media data.

BACKGROUND

TV services broadcast over an IP network are referred to as IPTV. IPTV is typically broadcast using a broadband access network, in which channels are transmitted over a broadband network from a super head-end down to an end-user's set top box (STB).

Linear content delivery, in which all channels in a subscription are simultaneously delivered to a user's set top box (STB), is not suitable for IPTV, as IPTV has limited bandwidth available over a broadband connection. A typical ADSL broadband connection provides a capacity of between 3 and 8 Mbps, and ADSL2 promises to deliver up to 25 Mbps downstream, whereas VDSL can provide a capacity of greater than 30 Mbps. Standard quality MPEG 2 IPTV content requires 2 Mbps per channel, and HDTV will require around 8-10 Mbps per channel. The MPEG 4 standard will approximately halve the bandwidth required to deliver IPTV content with the same quality. Nevertheless, the available bandwidth is a scarce resource, and IPTV solutions must limit the number of channels that can be delivered simultaneously.

FIG. 1 illustrates a known way of distributing media in which an IPTV media stream originates in a service provider network 1, is passed to a core network 2, is further passed into a metro network 3, and finally is sent via access networks 4 to each home network 5 that contains an STB that wishes to receive the media stream. Networks can quickly become saturated due to heavy traffic loads. In order to mitigate this problem, content can be multicast to reduce bandwidth demands for broadcast TV distribution. Furthermore, Video on Demand (VoD) services can be handled by VoD cache servers located close to the end-user. However, such caches require additional investment, and many routers would need to be replaced, as existing routers may not support IPTV multicasts.

It is known to distribute an IPTV service using a Peer to Peer (P2P) network, as illustrated in FIG. 2. Each STB is a peer in the network. An IPTV media stream can be delivered to a STB from another STB, from a media injector from which the stream originates, or from any other peer in the network.

An IPTV media stream is typically compressed in order to save bandwidth. An example of a compressed media format is MPEG. MPEG media streams contain different frames, such as I-frames, P-frames and B-frames. I-frames do not depend on data contained in the preceding or following frames, as they contain a complete picture. P-frames provide more compression than I-frames because they utilize data contained in the previous I-frame or P-frame. When generating a P-frame, the preceding frame is reconstructed and altered according to incremental extrapolation information. B-frame are similar to P-frames, except that B-frames interpolate data contained in the following frame as well as the preceding frame. As a result, B-frames usually provide more compression than P-frames. Typically, every 15th frame or so is an I-frame. P-frames and B-frames might follow an I-frame as follows: IBBPBBPBBPBB(I). The order and number of frames in the sequence can be varied.

Since B and P frames depend on adjacent frames it is necessary that when the STB receives a new channel, it receives a full I-frame before the new channel can be shown. The average time for switching between channels therefore depends on the length of time between I-frames. Typically, for MPEG-2 IPTV content, the length of time is around 0.5 seconds. For MPEG-4 part 10 IPTV content, the length of time between I-frames can be several seconds.

The media stream includes payload data and metadata. The payload data is the media data itself, and is decoded and shown by the receiver. Payload data typically comprises frames as described above. The metadata includes all other data in the media stream. This may be, for example, data describing the payload data, or information establishing signalling between two peers. In order to facilitate handling of the media stream, the media stream is sent in "fragments". Fragments are discrete portions of the media stream containing both the payload data and the metadata.

A buffer containing fragments is illustrated in FIG. 3. A fragment may contain both metadata about the media stream, and payload data from the media stream itself. A P2P logic function (in, for example, a STB) requests fragments from other P2P peers. In the example of FIG. 3 the P2P logic is writing fragment number 21 into the buffer and fragment number 17 is sent to the video decoder.

In multi-source networks such as P2P networks or redundant networks, a peer node obtains data by sending a request message to other peers and/or media injectors. It is possible for a peer node, having identified other nearby peers and/or media injectors capable of providing a particular channel, to request all fragments containing frames of that channel from all suitable peers. In other words, the peer node may opt for a "give me everything" strategy. The nearby peers or redundant transmitters will then send all available data to the peer node. This is a good strategy to ensure that all of the initial data required is received, but results in a very inefficient use of network resources.

The method works well for obtaining static data over a P2P network or a redundant network, for example in file sharing applications or distributing VoD. However, for real time data transfer, such as IPTV broadcasts, this would lead to a large amount of unnecessary data being sent which could reduce the effective bandwidth of the network.

SUMMARY

The inventors have realised the problems associated with the prior art and devised an apparatus and method to reduce the amount of unnecessary data sent in a multi-source network such as a P2P or a redundant network. A selective blocking subscription mechanism is used to block data at the transmitter or in an intermediary node, enabling the dynamic reduction of data actually reaching the subscriber to a more optimal data flow.

In accordance with a first aspect of the present invention there is provided a method of obtaining a media stream provided as a plurality of media fragments from a plurality of remote nodes in a communications network. Media fragments are requested from the plurality of remote nodes. A series of media fragments is received from at least one of the plurality of remote nodes. A selection criterion is determined for identifying the series of data fragments, and a blocking request is sent to at least one other of the plurality of remote nodes, the blocking request instructing the at least one other node to block transmission of media fragments satisfying the selection criterion. It will be noted that that the blocking request is not just for fragments currently residing in the buffers of the remote nodes, but is more like a blocking subscription for all fragments matching the selection criteria that the remote nodes will receive.

In accordance with a second aspect of the present invention there is provided a method of sending a media stream to a requesting node in a communications network. A request for media fragments is received from the requesting node. Media fragments are sent towards the requesting node. A blocking request may be received from the requesting node, the blocking request including a selection criterion for identifying certain media fragments. If so, transmission of fragments identified by the selection criterion is blocked.

As an option, the selection criterion is used to select each media fragment based on a sequence number of each fragment. Examples of such selection criteria include selecting all media fragments having a sequence number matching a cyclic function, and selecting all media fragments having a sequence number matching a modulus function.

As an alternative option, the selection criterion comprises selecting media fragments containing data of a predetermined type. Examples of media fragments containing data of a predetermined type include media fragments containing data selected from any of I-frames, P-frames and B-frames. This is advantageous where the requesting node has knowledge that a remote node is only receiving fragments containing data of a predetermined type. For example, the remote node may only be subscribing to I-frames, in which case that node can be used to provide I-frames and other nodes can be used to provide other frames.

As an option, the communications network is a Peer to Peer communications network. However, the method equally applies to other types of network in which the same real time media stream can be obtained from more than one source.

In accordance with a third aspect of the present invention there is provided a node for use in a communications network. The node comprises a transmitter for requesting media fragments from a plurality of remote nodes. A receiver receives media fragments from at least one of the plurality of remote nodes. A logic function determines a selection criterion for identifying the received data fragments. The received data fragments are stored in a buffer. The transmitter is configured to send a blocking request to at least one other of the plurality of remote nodes, the blocking request instructing the at least one other node to block the media fragments satisfying the selection criterion from being sent. Optionally, the node is a Set Top Box in which case it may also be provided with a media renderer. As a further option, the node is a proxy node arranged to act on behalf of a Set Top Box.

According to one option, the logic function is arranged to use selection criteria based on a sequence number of each media fragment. Examples of such selection criteria include selecting media fragments having a sequence number matching a cyclic function, and selecting media fragments having a sequence number matching a modulus function. Alternatively, the logic function is arranged to use selection criterion based on media fragments containing data of a predetermined type, for example media fragments containing I-frames, P-frames or B-frames.

Optionally, the logic function is arranged to balance a load on the communications network by selectively blocking media fragments from particular remote nodes using the selection criteria, in order to improve the efficiency of the network and reduce the risk of disruption to the media stream.

According to a fourth aspect of the invention, there is provided a node for use in a communications network. The node comprises a receiver for receiving from a requesting node a request for media fragments, the media fragments forming part of a media stream. A transmitter is configured to send the determined media fragments to the requesting node. The receiver may receive a blocking request from the requesting node, the blocking request including a selection criterion for identifying certain media fragments. The node includes a logic function for processing the blocking request and identifying media fragments at the node which match the selection criterion. The transmitter will then block transmission of fragments identified by the selection criterion.

According to a fifth aspect of the invention, there is provided apparatus for use in sending or receiving media over a communications network, the apparatus comprising means for performing the method described above in the first or second aspect of the invention.

According to a sixth aspect of the invention, there is provided a program for controlling an apparatus to perform the method described above in the first or second aspect of the invention.

According to a seventh aspect of the invention, there is provided a program which, when loaded into an apparatus, causes the apparatus to become an apparatus as described above in the fifth aspect of the invention.

According to a eighth aspect of the invention, there is provided a program described above in either of the sixth or seventh aspects of the invention, carried on a carrier medium. The carrier medium is optionally a storage medium.

According to an ninth aspect of the invention, there is provided a storage medium containing a program as described above in either of the sixth or seventh aspects of the invention.

DETAILED DESCRIPTION

The following description sets forth specific details, such as particular embodiments, procedures, techniques, etc. for purposes of explanation and not limitation. In some instances, detailed descriptions of well known methods, interfaces, circuits, and devices are omitted so as not obscure the description with unnecessary detail. Moreover, individual blocks are shown in some of the drawings. It will be appreciated that the functions of those blocks may be implemented using individual hardware circuits, using software programs and data, in conjunction with a suitably programmed digital microprocessor or general purpose computer, using application specific integrated circuitry, and/or using one or more digital signal processors.

Figure 1:
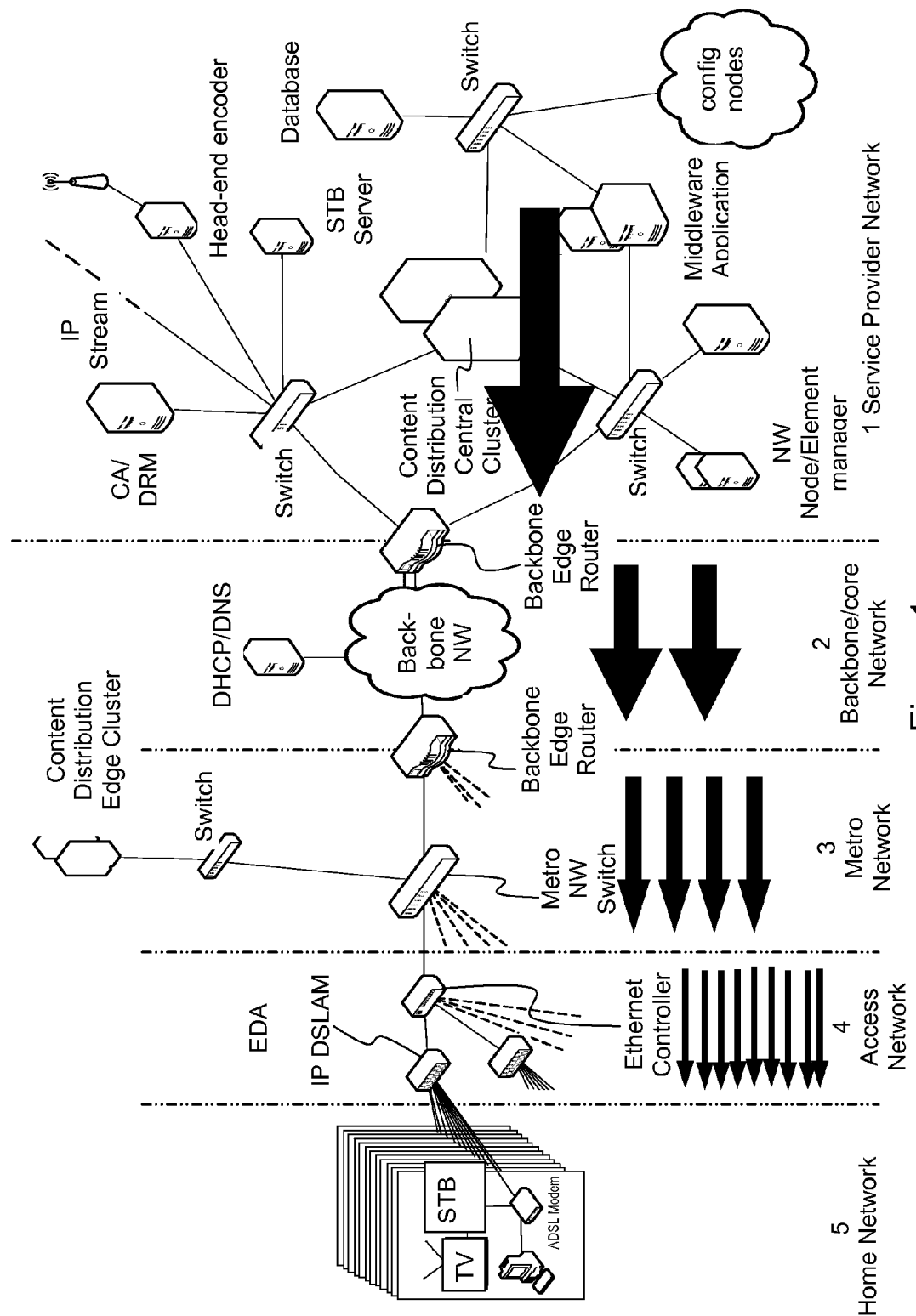
FIG. 1 illustrates schematically in a block diagram an architecture for the distribution of IPTV.
Figure 2:
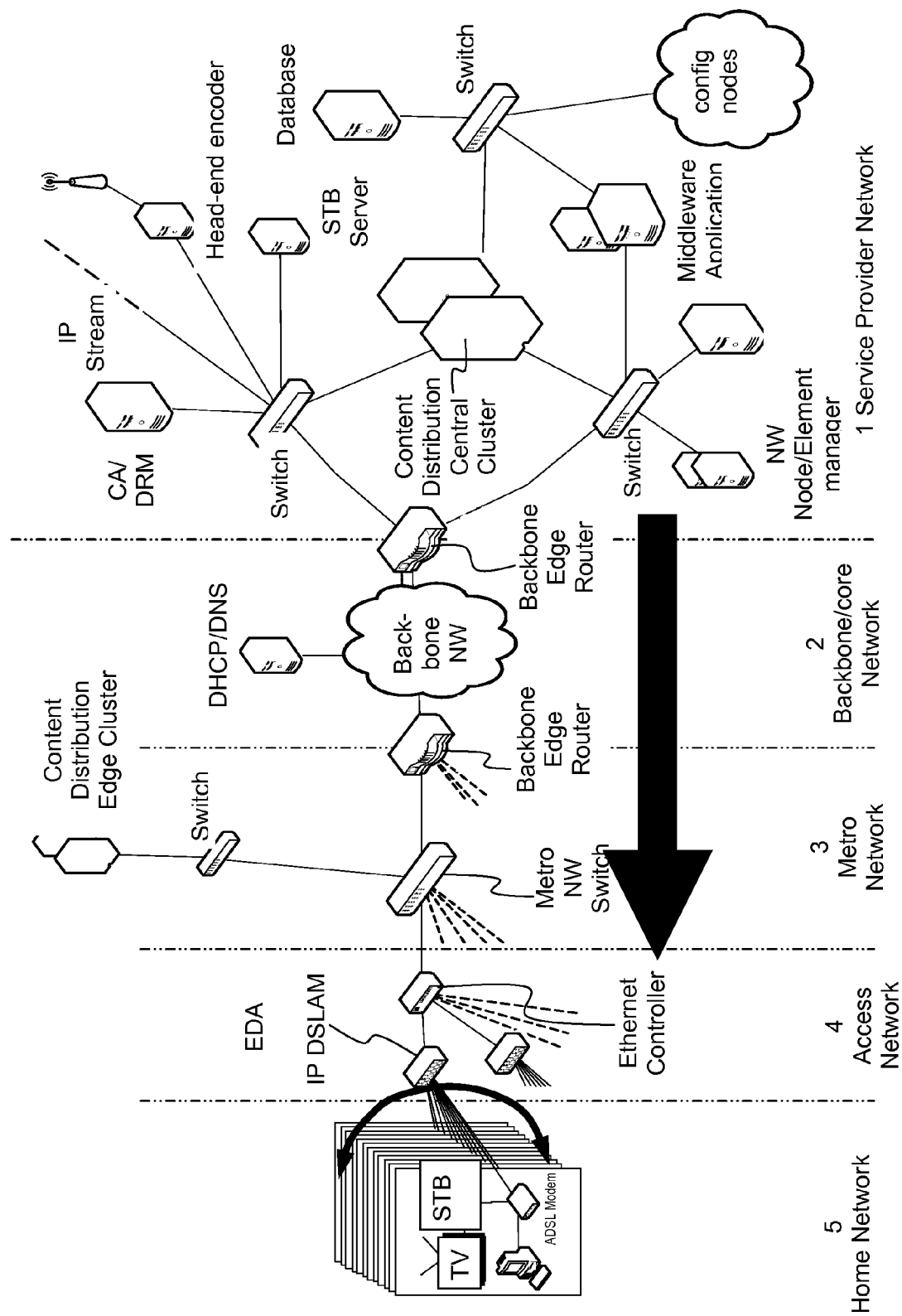
FIG. 2 illustrates schematically in a block diagram an architecture for the distribution of IPTV in a peer to peer network.
Figure 3:
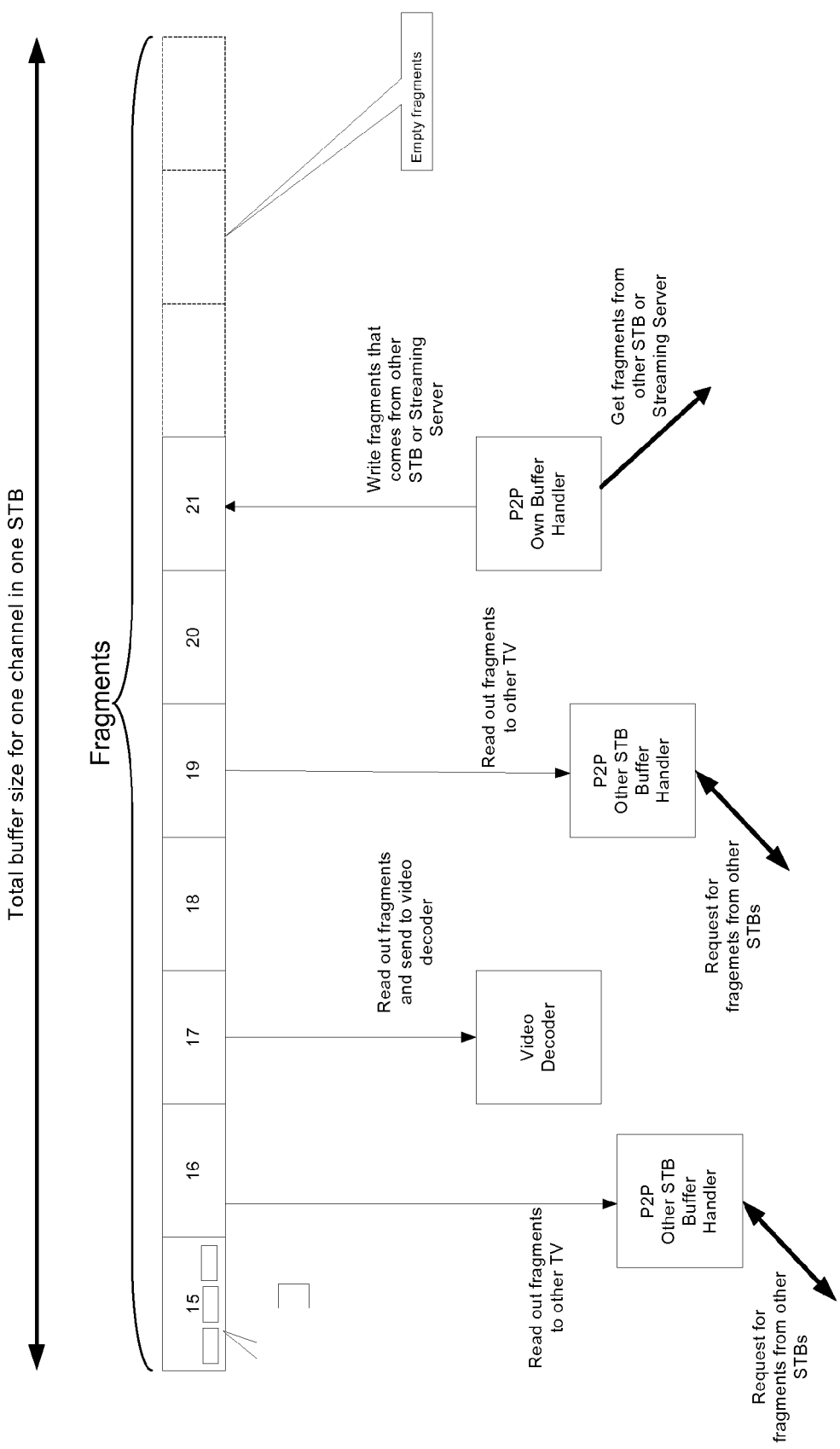
FIG. 3 illustrates schematically in a block diagram a buffer in a STB containing data fragments.
Figure 4:
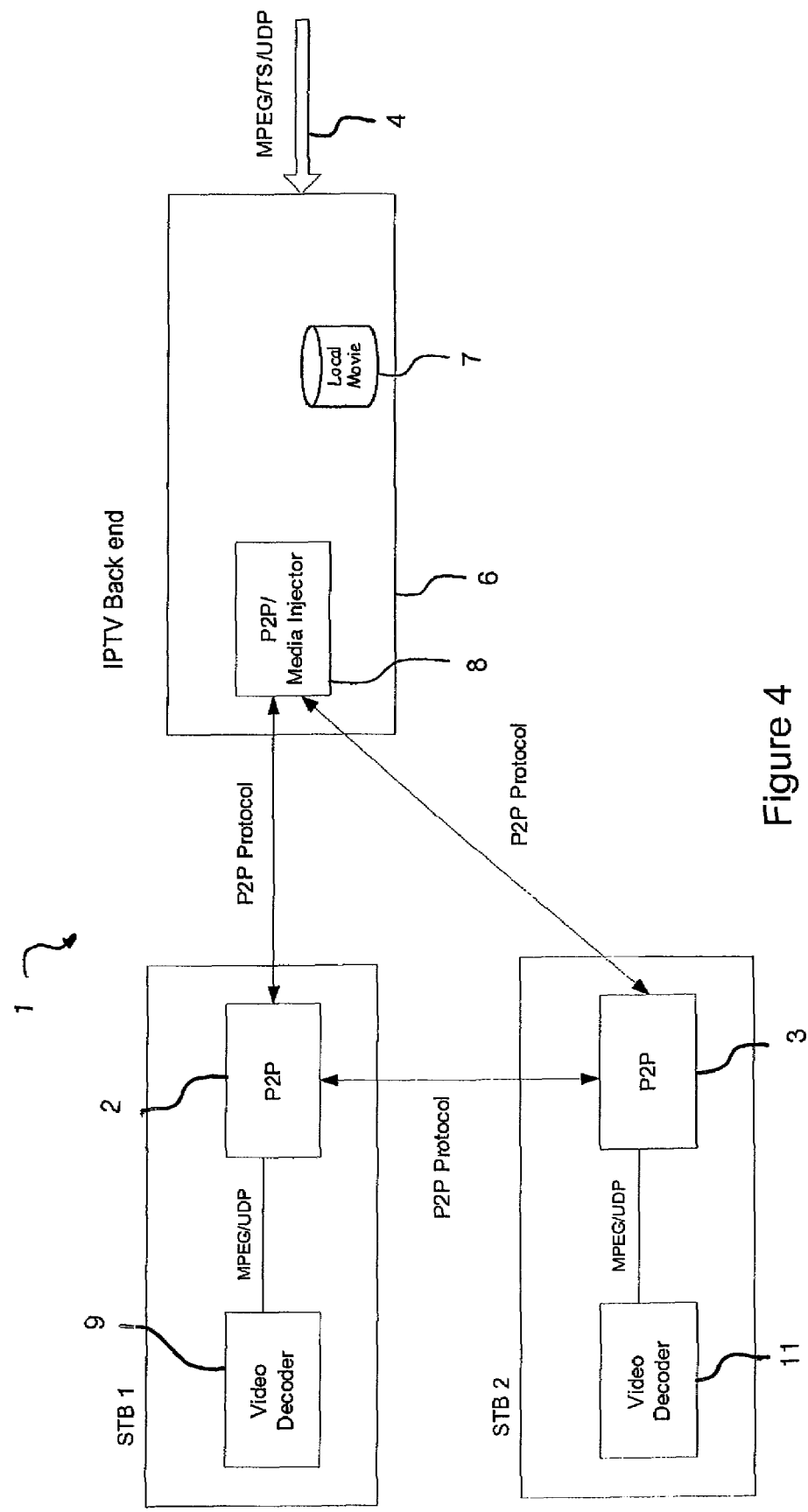
FIG. 4 illustrates schematically in a block diagram a media injector and two Set Top Boxes.

IPTV P2P requires a media injector in order to introduce the IPTV media stream into the network, although the media injector is not a true peer in the network in the sense that it sends media data but does not receive media data from the peers. This is illustrated in FIG. 4, which is a schematic representation of a simple IPTV P2P network 1. The network 1 includes an IPTV server 6 and two STBs STB1 and STB2. Each STB includes a P2P network interface 2, 3 to which is connected a video decoder 9, 11. In this example, STB2 receives the IPTV media stream from both STB1 and the IPTV Server 6, which injects either streaming content 4 or content from a database 7 using a P2P media injector 8. Note that other network nodes (in addition to STBs) may be peers in the network.

Figure 5:
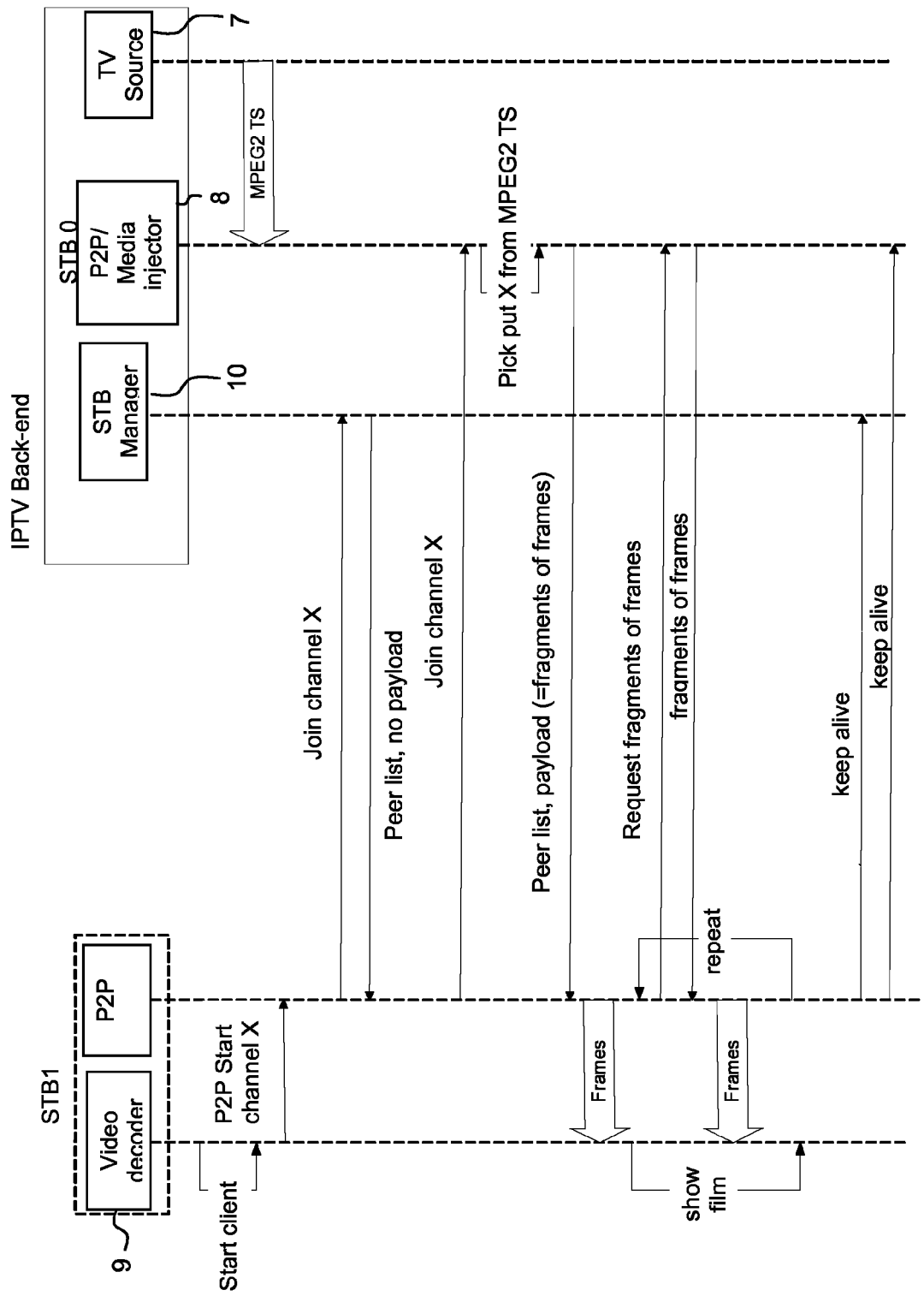
FIG. 5 illustrates schematically in a block diagram the signalling required to initiate an IPTV broadcast with a first Set Top Box.

FIG. 5 illustrates typical signalling required to initiate an IPTV broadcast with a first STB STB1. The video decoder 9 in STB1 receives an instruction from a user to start channel X. This is relayed to the P2P network interface 2 in STB1, which sends a request to a STB manager 10 in the IPTV back-end to join channel X. The STB Manager 10 returns a peer list to the P2P function in STB1, but no IPTV media stream. The peer list includes the P2P media injector 8. Since the media injector can be considered as a peer in the network, it is termed STB0. The P2P function in STB1 then sends a request to join channel X to STB0. STB0 receives an IPTV media stream from an IPTV media stream source (for example, from the database 7), and sends a peer list and an IPTV media stream comprising fragments of frames to the P2P network interface of STB1. The P2P network interface of STB1 sends the frames to the video decoder 9 in STB1, which can then show the IPTV media stream to the user.

Figure 6:
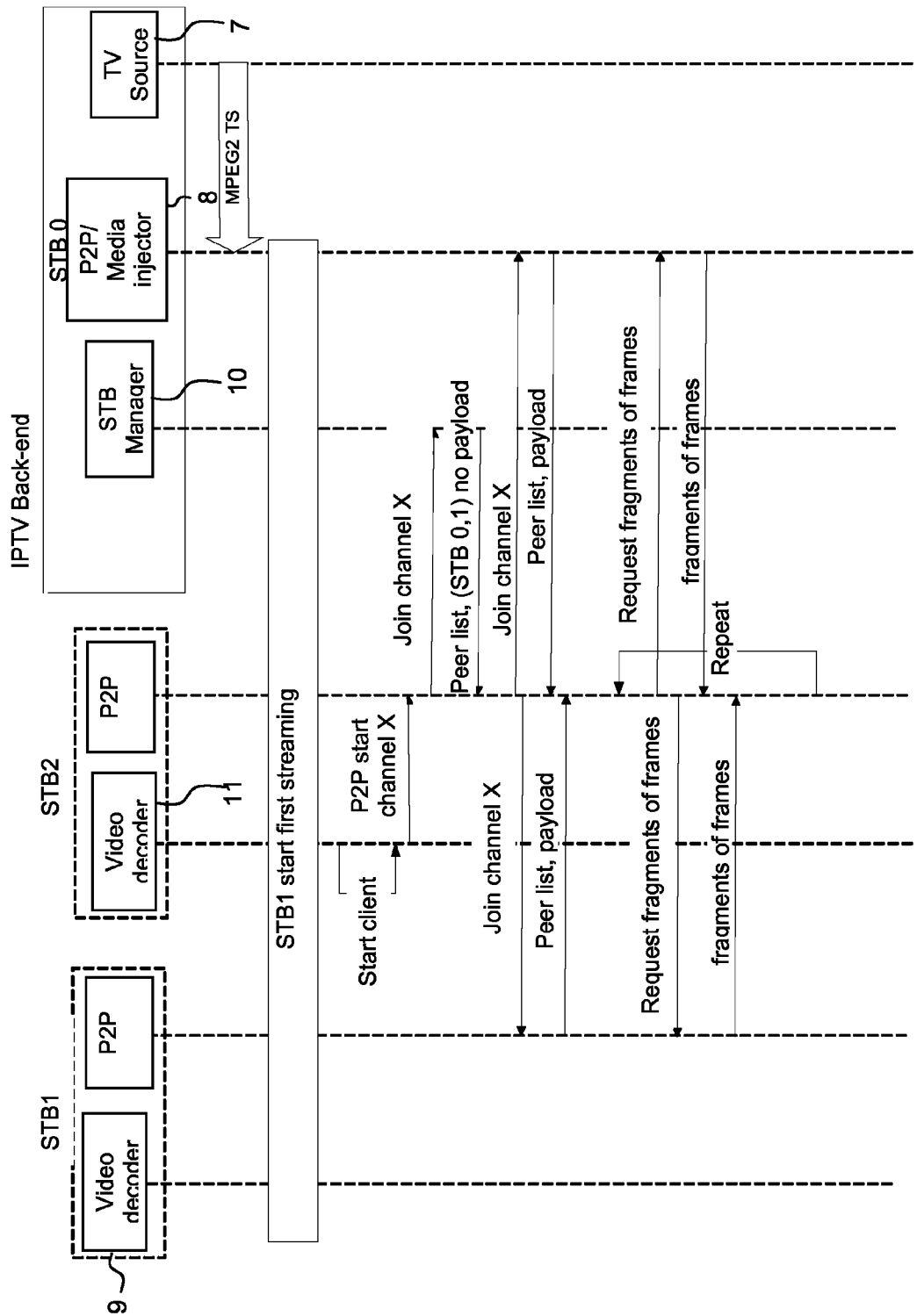
FIG. 6 illustrates schematically in a block diagram the signalling required to initiate an IPTV broadcast with a further Set Top Box.

FIG. 6 illustrates typical signalling required to initiate an IPTV broadcast with a further STB STB2. It is assumed that STB1 is already receiving an IPTV media stream from STB0. When the user of STB2 wishes to receive channel X, he sends an instruction to logic within STB2, which is relayed to a P2P network interface in STB2. The P2P network interface in STB2 sends a request join channel X to the STB manager 10. The STB manager 10 returns a peer list but no payload to STB2. The peer list includes STB0 and STB1, as these are both possible sources for the IPTV media stream. The P2P function in STB2 then sends a request to each of STB0 and STB1 to join channel X. STB0 and STB1 each send a peer list and IPTV data stream to the P2P network interface in STB2, which passes the frames of the IPTV media stream to the video decoder.

Figure 7:
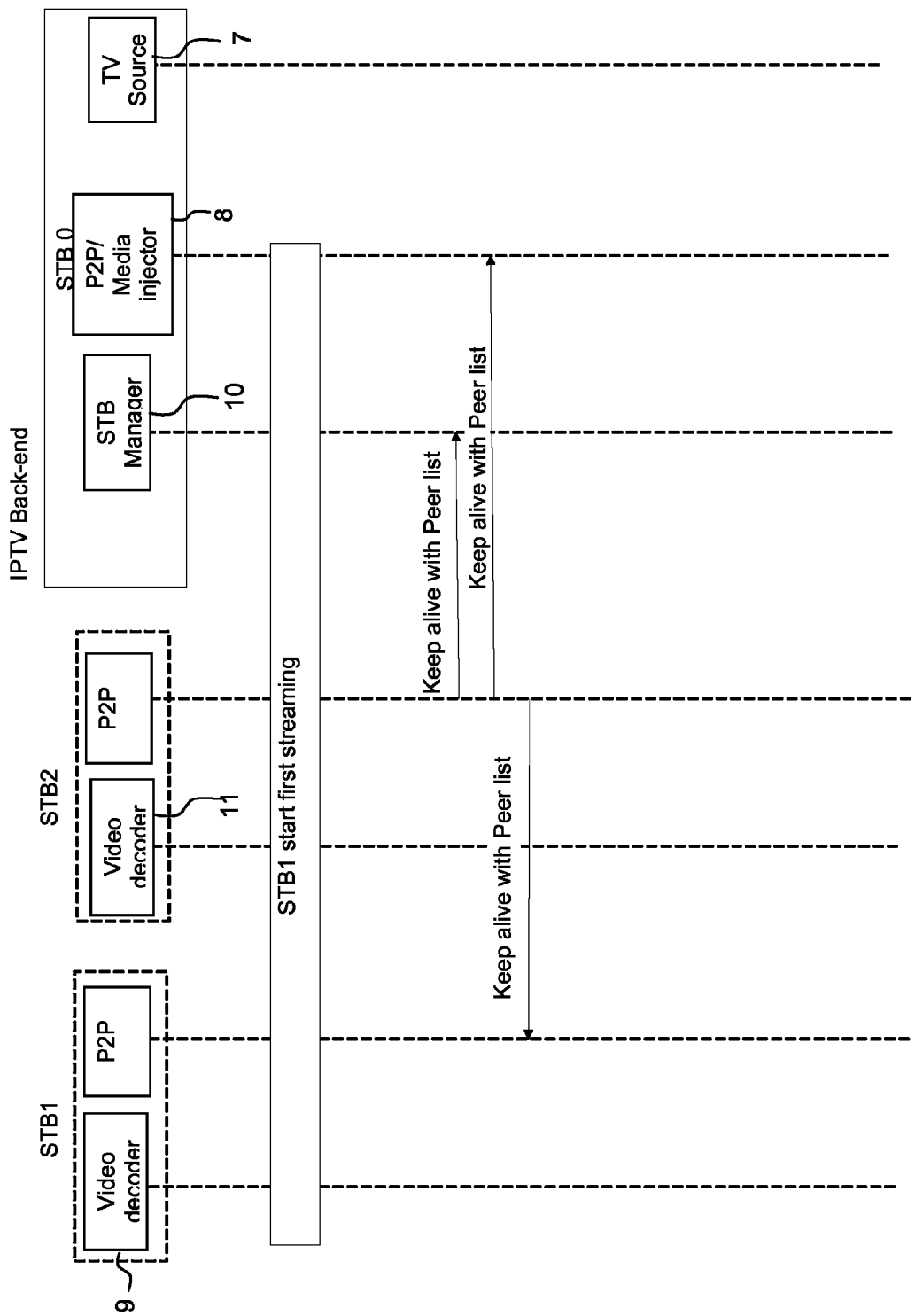
FIG. 7 illustrates schematically in a block diagram keep alive messages sent by a Set Top Box.

It is advantageous for all peers in the P2P network to send each other "keep alive" messages, as illustrated in FIG. 7, to ensure that each STB is included in the list of peers and can both send and receive IPTV media streams.

Note that the term "IPTV media stream" is used herein to refer to any kind of media data having real time requirements, and includes user defined TV content, interactive TV, interactive or co-operative games, or audio media. The media stream is to be delivered to the user such that the user can observe the media content at a constant rate without interruptions or delays. There is some latency in the P2P network, caused by buffers in each STB and the time it takes to establish communication between peers. The term "media stream" need not necessarily refer to the media data injected into the network by a media injector, but can also be used to refer to media data received from other peers in a P2P network.

As described above, a request/response or DHT method is typically used to request content from other peers in a P2P network. If all nearby peers having the required content send all of it, the data traffic is much higher than it needs to be, because the peer will receive the same fragments many times over. It will be appreciated that, although the following description refers to peers in a P2P network receiving IPTV media streams, the method can equally apply to obtaining "static" data such as VoD or in file sharing applications.

Figure 8:
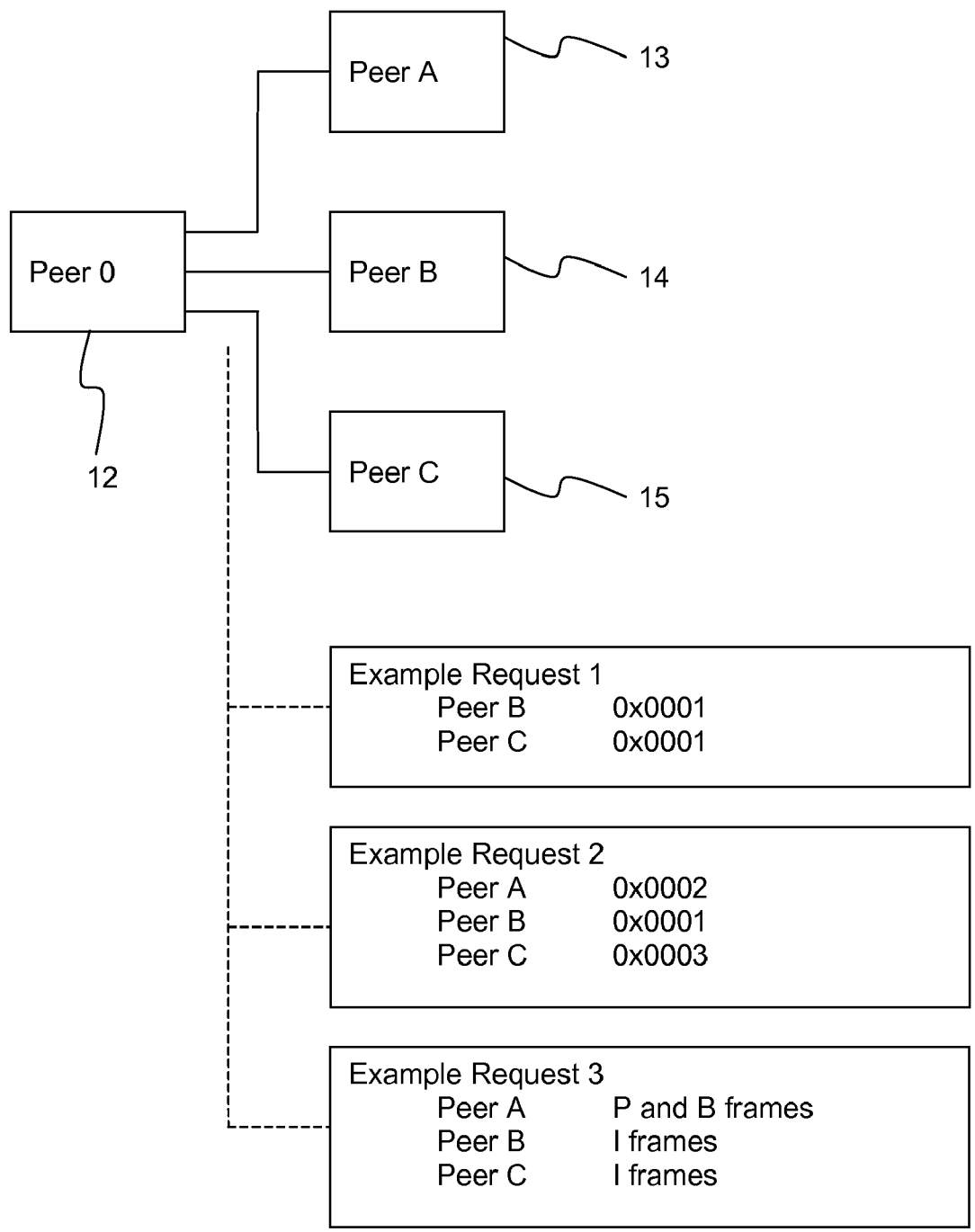
FIG. 8 illustrates schematically in a block diagram example requests from a peer node to other per nodes in a communications network.

All fragments in a media stream have sequence numbers. These may be used in order to block specific peer nodes in the P2P network from sending specific fragments. FIG. 8 illustrates parts of a network having a peer 12 connected to three other peers: peer A 13, peer B 14 and peer C 15. The initiating peer 12 (labeled peer 0) requests fragments of content from peer A 13, peer B 14 and peer C 15.

When some of the content (i.e. a fragment) arrives at the requesting peer 12, it deduces that other packets matching a pattern can gathered from the same source. A "blocking" request can therefore be sent to the other peers to ensure that fragments matching that pattern are no longer sent. This saves the bandwidth that would otherwise have been used for redundant packages. The blocking request should be formed via a function or algorithm that informs a peer not to send any content matching the function or algorithm. The functionality can also be implemented in any intermediary node such as a firewall or orchestrating gateway.

The requests are initiated by P2P logic within the peer. The blocking request uses selection criteria to request fragments having a sequence number that matches a selection criterion. The blocking request can be thought of as a subscription, so that the peer that receives the request knows that the requesting peer requires not only that fragments currently stored in the peer's buffer that match the selection criterion should be blocked, but all future fragments that the peer receives that match the selection criterion should also be blocked.

The selective blocking can be done utilizing a multitude of different methods such as modulus mathematics, cyclic functions, collision mathematics or Fourier algorithms. For example, suppose that all of the neighbouring nodes 12-15 use an 8-bit cyclic pattern. If the requesting peer 12 receives fragment 1 (i.e. the first fragment of an 8-bit sequence) from peer A 13, it assumes that it will also receive the first fragment of all subsequent sequences from peer A, and that fragment 1 of all subsequent sequences therefore need not be sent by any other peers. The requesting peer 12 therefore sends a blocking request to peers B and C 14, 15 to tell them not to send fragment 1 of each 8-bit sequence. This blocking request may take the form of the hexadecimal instruction 0x01 (or binary 0x00000001). Each of B & C blocks media fragments in a cycle corresponding to the binary 1 in the subscription, and so does not send the first fragment of each subsequent cycle. This is illustrated in Example Request 1 of FIG. 8.

Suppose the requesting node 12 then receives fragment 2 (the second fragment of the 16-bit sequence) from peer B 14. Now it knows that fragment 1 of each sequence will always be received from peer A 13, and that fragment 2 of each sequence will always be received from peer B 14. Therefore peer A need not send fragment 2 of each sequence, peer B need not send fragment 1 of each sequence, and peer C need not send either fragment 1 or fragment 2 of each sequence. So a blocking request 0x02 (binary 0x00000010) is sent to peer A 13 to inform it that fragment 2 of each sequence should not be sent, and blocking request 0x03 (binary 0x00000011) is sent to peer C 15, to inform it that neither fragment 1 nor fragment 2 of each sequence should be sent. The blocking request 0x01 has of course already been sent to peer B 14. This is shown in Example Request 2 of FIG. 8.

It will be apparent that other rules (e.g. modulus mathematics, collision mathematics, Fourier algorithms etc.) may be used for blocking media fragments, giving more advanced patterns. It may even be that peer A 13 (for example) provides all of the fragments of a sequence, in which case the blocking request sent to peers B & C 14, 15 would be 0xFF.

It is also possible to block only certain types of media fragment, as illustrated in Request example 3 in FIG. 8. In this example, a peer A 13 may be receiving only I frames for Channel 4 in order to show a representation of Channel 4 in a Picture in Picture (PiP application). The peer 12 may therefore block media fragments containing I frame data from peers B and C 14, 15. P and B frame fragments could be blocked from peer A and delivered by peers B and C.

Figure 9:
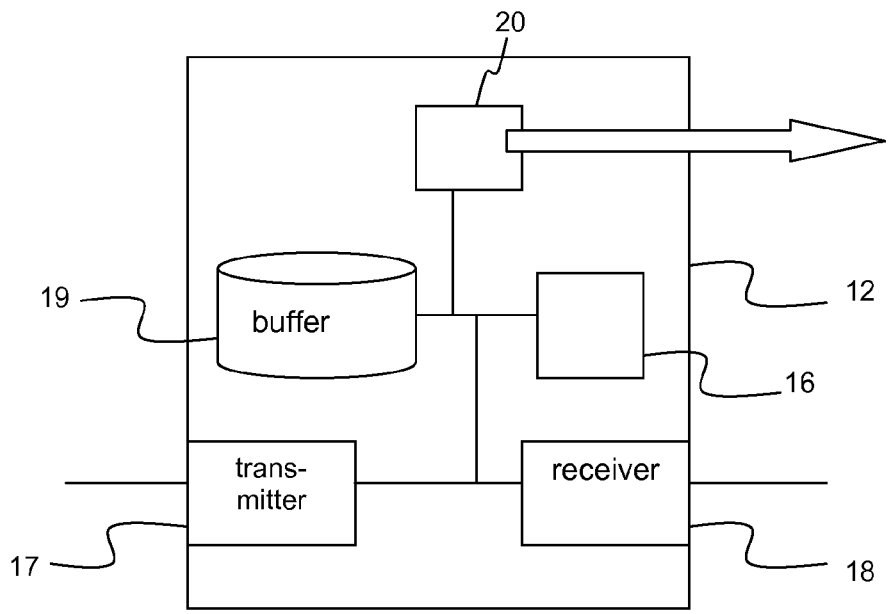
FIG. 9 illustrates schematically in a block diagram a peer node according to an embodiment of the invention.

Referring to FIG. 9 herein, there is illustrated schematically in a block diagram a peer node according to an embodiment of the invention. The peer node 12 comprises a P2P logic function 16 for initiating requests for media fragments from other peer nodes. A transmitter 17 is provided for sending a request for a series of fragments, and a receiver 18 is provided for receiving the fragments from other peer nodes. The node 12 comprises a buffer 19 for storing the received media fragments, and may also comprise a media renderer 20 for rendering the received fragments. The transmitter 17 also sends blocking requests in response to fragments received from nearby nodes. The node is typically an STB, but may be any node in the network, for example a proxy acting on behalf on an STB, in which case the media renderer 20 may not be provided.

FIG. 9 can also be used to illustrate an example of a peer node that receives a request for a series of media fragments. The buffer 19 is a memory for storing a plurality of fragments, and the receiver 18 receives a request for fragments from a requesting peer node. The transmitter 17 is initially used to send all media fragments in the buffer 19 to the requesting node. When the requesting peer node has received fragments, The receiver 18 is also used to receive blocking requests from the requesting node. The logic function 16 is used to process the blocking requests and determine which media fragments match the selection criterion. All subsequent fragments that match the selection criterion will not be sent to the requesting node.

Figure 10:
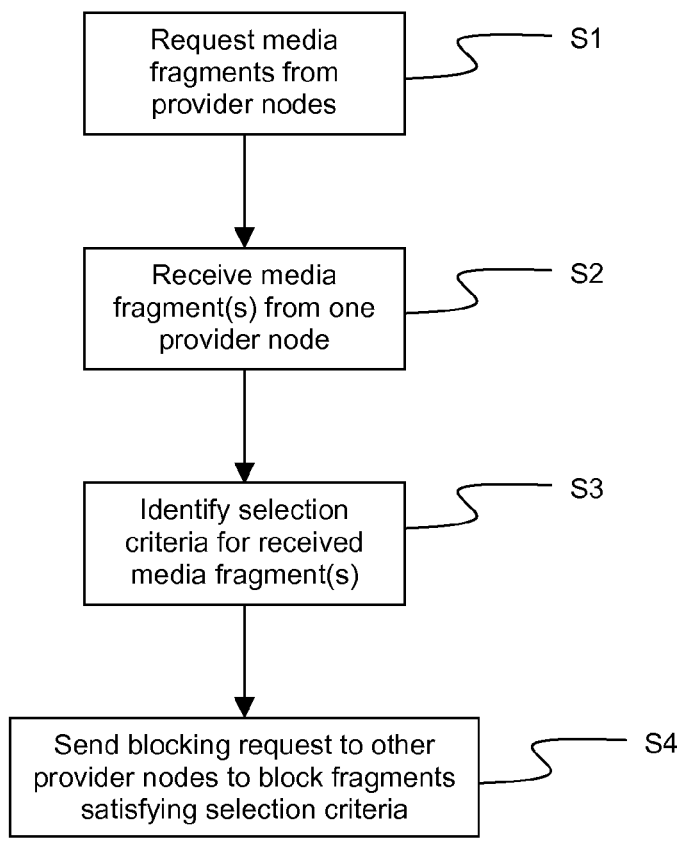
FIG. 10 is a flow diagram illustrating the tasks carried out by a peer node according to an embodiment of the invention.

FIG. 10 is a flow diagram illustrating how the requesting node operates.
S1: Media fragments are requested from all nearby nodes providing content.
S2: One or more media fragments are received from one of the nearby nodes.
S3: Selection criteria are determined, enabling the identification of the media fragments received.
S4: A blocking request is sent to other nodes providing content—and/or to intermediary nodes such as firewalls or orchestrating gateways—to block fragments matching the selection criteria.

The invention reduces the amount traffic sent unnecessarily, leading to a more efficient use of available bandwidth. The invention is suitable for use in obtaining both dynamic streaming data such as IPTV content, in addition to static data such as VoD. However, it should be noted that it is particularly suited to obtaining dynamic streaming data because the data in each peer's buffer is constantly changing, and the amount of signalling required to inform other peer nodes of available media fragments is minimized. Furthermore, the decision about which fragments to block is made dynamically, so no prior knowledge of the balancing of the network is required.

Although various embodiments have been shown and described in detail, the claims are not limited to any particular embodiment or example. None of the above description should be read as implying that any particular element, step, or function is essential such that it must be included in the claims' scope. The scope of protection is defined by the claims. For example, the invention has been described with respect to dynamic streamed IPTV media distributed via a P2P network. However, it can be used in any network where the data is obtained from multiple sources.

The invention claimed is:

1. A method of obtaining a media stream provided as a plurality of media fragments from a plurality of remote nodes in a communications network, the method comprising:
   requesting media fragments from the plurality of remote nodes;
   receiving a series of media fragments from at least one remote node of the plurality of remote nodes;
   determining a selection criterion for identifying a pattern fitting the received series of media fragments; and
   sending a blocking request to at least one other of the plurality of remote nodes, the blocking request instructing the at least one other node to block transmission of the media fragments satisfying the selection criterion.

2. The method of claim 1, wherein the selection criterion is arranged so that media fragments are selected based on a sequence number of each fragment.

3. The method of claim 2, wherein the selection criterion includes all media fragments having a sequence number matching a cyclic function.

4. The method of claim 2, wherein the selection criterion includes all media fragments having a sequence number matching a modulus function.

5. The method of claim 1, wherein the selection criterion comprises selecting media fragments containing data of a predetermined type.

6. The method of claim 5, wherein the predetermined type includes media data selected from the group consisting of I-frames, P-frames and B-frames.

7. The method according to claim 1, wherein the communications network is a Peer to Peer communications network.

8. A method of sending a media stream to a requesting node in a communications network, the method comprising:
   receiving a request for media fragments;
   transmitting media fragments towards the requesting node;
   receiving a blocking request from the requesting node, the blocking request including a selection criterion for identifying certain media fragments corresponding to a pattern; and
   blocking transmission of media fragments identified by the selection criterion while continuing to transmit fragments not identified by the selection criterion.

9. The method of claim 8, wherein the selection criterion is arranged so that media fragments are selected based on a sequence number of each fragment.

10. The method of claim 9, wherein the selection criterion includes all media fragments having a sequence number matching a cyclic function.

11. The method of claim 9, wherein the selection criterion includes all media fragments having a sequence number matching a modulus function.

12. The method of claim 9, wherein the selection criterion comprises selecting media fragments containing data of a predetermined type.

13. The method of claim 12, wherein the predetermined type includes media data selected from the group consisting of I-frames, P-frames and B-frames.

14. The method according to claim 8, wherein the communications network is a Peer to Peer communications network.

15. A node operative in a communications network, the node comprising:
- a transmitter operative to request media fragments from a plurality of remote nodes;
- a receiver operative to receive media fragments from at least one of the plurality of remote nodes;
- a logic function operative to determine a selection criterion for identifying a pattern fitting the received series of media fragments; and
- a buffer operative to store the received fragments;
- wherein the transmitter is further operative to send a blocking request to at least one other of the plurality of remote nodes, the blocking request instructing the at least one other node to block the media fragments satisfying the selection criterion from being sent.

16. The node of claim 15, wherein the node is selected from the group consisting of a Set Top Box and a proxy node arranged to act on behalf of a Set Top Box.

17. The node of claim 15, wherein the logic function is operative to use selection criteria based on a sequence number of each media fragment.

18. The node of claim 17, wherein the selection criteria is selected from the group consisting of media fragments having a sequence number matching a cyclic function, and media fragments having a sequence number matching a modulus function.

19. The node of claim 15, wherein the logic function is operative to use selection criterion based on media fragments containing data of a predetermined type.

20. The node of claim 15, wherein the logic function is arranged to balance a load on the communications network by selectively blocking media fragments from particular remote nodes using the selection criteria.

21. A node operative in a communications network, the node comprising:
- a receiver operative to receive from a requesting node a request for media fragments, the media fragments forming part of a media stream, and further operative to receive a blocking request from the requesting node, the blocking request including a selection criterion for identifying certain media fragments corresponding to a pattern;
- a logic function for processing the blocking request and identifying media fragments at the node which match the selection criterion; and
- a transmitter operative to send the determined media fragments to the requesting node, and further operative to block transmission of fragments identified by the selection criterion, while continuing to transmit fragments not identified by the selection criterion.

22. A non-transitory machine readable medium including program logic comprising machine executable code operative to cause a node in a communications network to obtain a real time media stream provided as a plurality of media fragments from a plurality of remote nodes in the network by performing the steps of:
- requesting media fragments from the plurality of remote nodes;
- receiving a series of media fragments from at least one remote node of the plurality of remote nodes;
- determining a selection criterion for identifying a pattern fitting the received series of media fragments; and
- sending a blocking request to at least one other of the plurality of remote nodes, the blocking request instructing the at least one other node to block transmission of the media fragments satisfying the selection criterion.

* * * * *